US011038832B2

(12) United States Patent
Patil et al.

(10) Patent No.: US 11,038,832 B2
(45) Date of Patent: Jun. 15, 2021

(54) RESPONSE STATUS MANAGEMENT IN A SOCIAL NETWORKING ENVIRONMENT

(71) Applicant: INTERNATIONAL BUSINESS MACHINES CORPORATION, Armonk, NY (US)

(72) Inventors: Rajesh Patil, Pune (IN); Prasad P. Purandare, Pune (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/519,427

(22) Filed: Jul. 23, 2019

(65) Prior Publication Data

US 2019/0349329 A1    Nov. 14, 2019

Related U.S. Application Data

(63) Continuation of application No. 15/481,685, filed on Apr. 7, 2017, now Pat. No. 10,367,776.

(51) Int. Cl.
*G06F 15/16* (2006.01)
*H04L 12/58* (2006.01)
(Continued)

(52) U.S. Cl.
CPC ...... *H04L 51/32* (2013.01); *G06Q 10/063114* (2013.01); *G06Q 10/1093* (2013.01);
(Continued)

(58) Field of Classification Search
CPC ..... H04L 51/32; H04L 12/1863; H04L 51/02; H04L 51/24; H04L 51/34;
(Continued)

(56) References Cited

U.S. PATENT DOCUMENTS 6,175,859 B1    1/2001   Mohler
6,703,930 B2 *  3/2004   Skinner ............... G08B 25/006
                                                  340/531
(Continued)

FOREIGN PATENT DOCUMENTS

WO    2016065454 A1    5/2016

OTHER PUBLICATIONS

Patil et al, "Response Status Management," Application and Drawings, Filed on Sep. 11, 2017, 51 Pages, U.S. Appl. No. 15/700,629.
(Continued)

*Primary Examiner* — Alicia Baturay
(74) *Attorney, Agent, or Firm* — Alexis N. Hatzis

(57) ABSTRACT

Disclosed aspects relate to response status management in a social networking environment. A message from a source user to a recipient user may be detected in the social networking environment in response to a triggering event, wherein the triggering event is the recipient user being added to a guest list, and wherein the message is a party invitation. A set of message response actions related to the recipient user may be identified. A response status may be determined based on the set of message response actions, wherein the response status relates to the recipient user. An indication of the response status may be provided to the source user, wherein the indication includes a gif video indicator.

20 Claims, 7 Drawing Sheets

(51) Int. Cl.
*G06Q 50/00* (2012.01)
*H04W 4/12* (2009.01)
*G06Q 10/06* (2012.01)
*G06Q 10/10* (2012.01)
*H04L 12/18* (2006.01)

(52) U.S. Cl.
CPC ......... *G06Q 50/01* (2013.01); *H04L 12/1863* (2013.01); *H04L 51/02* (2013.01); *H04L 51/24* (2013.01); *H04L 51/34* (2013.01); *H04W 4/12* (2013.01)

(58) Field of Classification Search
CPC ....... G06Q 10/063114; G06Q 10/1093; G06Q 50/01; H04W 4/12
USPC ........................................................ 709/206
See application file for complete search history.

(56) References Cited

U.S. PATENT DOCUMENTS

| | | | |
|---|---|---|---|
| 7,027,567 B1 | 4/2006 | Scott | |
| 7,159,178 B2* | 1/2007 | Vogt | G06Q 10/10 709/203 |
| 8,271,591 B2 | 9/2012 | Malik | |
| 8,291,018 B2* | 10/2012 | Petersen | H04L 12/6418 709/205 |
| 8,832,233 B1 | 9/2014 | Brin | |
| 8,887,066 B1* | 11/2014 | Deng | G06F 40/274 715/753 |
| 9,021,034 B2* | 4/2015 | Narayanan | G06F 3/04842 709/206 |
| 9,223,479 B2* | 12/2015 | Deng | G06F 40/274 |
| 9,306,899 B1 | 4/2016 | Vendrow | |
| 9,391,944 B2* | 7/2016 | Deeter | H04L 51/32 |
| 9,595,072 B2* | 3/2017 | Fan | H04W 64/003 |
| 9,621,602 B2* | 4/2017 | Ryan | A61B 5/6887 |
| 9,660,993 B2* | 5/2017 | Brill | H04L 63/10 |
| 9,729,667 B2* | 8/2017 | LeBeau | H04W 4/021 |
| 9,832,308 B1 | 11/2017 | Rogers | |
| 9,876,831 B1* | 1/2018 | Leske | H04L 12/1818 |
| 9,998,796 B1* | 6/2018 | Kedenburg, III | H04N 21/4788 |
| 10,319,045 B2* | 6/2019 | Frank | G06Q 50/01 |
| 10,346,880 B2* | 7/2019 | Hu | G06Q 30/0269 |
| 10,367,776 B2* | 7/2019 | Patil | G06Q 50/01 |
| 10,397,162 B2* | 8/2019 | Deeter | H04L 51/32 |
| 10,506,289 B2* | 12/2019 | Akumiah | H04N 21/4788 |
| 10,536,418 B2* | 1/2020 | Brownhill | H04L 67/18 |
| 10,558,338 B2* | 2/2020 | Flynn, III | G06F 3/0488 |
| 10,585,991 B2* | 3/2020 | Miller | G06F 40/35 |
| 10,609,093 B2* | 3/2020 | Taine | H04L 51/10 |
| 10,617,949 B1* | 4/2020 | Paul | G06Q 50/01 |
| 10,664,524 B2* | 5/2020 | Sarkar | H04L 65/607 |
| 2003/0065565 A1 | 4/2003 | Wagner | |
| 2007/0226628 A1* | 9/2007 | Schlack | G06Q 10/10 715/733 |
| 2009/0055488 A1* | 2/2009 | Berry | G06Q 10/02 709/206 |
| 2009/0055513 A1* | 2/2009 | Berry | G06Q 10/02 709/219 |
| 2009/0132665 A1* | 5/2009 | Thomsen | H04L 67/04 709/206 |
| 2010/0299640 A1 | 11/2010 | Titus | |
| 2012/0173508 A1* | 7/2012 | Zhou | G06F 16/951 707/709 |
| 2014/0156745 A1* | 6/2014 | Hua | H04L 67/1029 709/204 |
| 2014/0207880 A1 | 7/2014 | Malkin | |
| 2014/0237380 A1* | 8/2014 | Kurrus | G06Q 10/1095 715/752 |
| 2014/0280292 A1 | 9/2014 | Skinder | |
| 2017/0011442 A1 | 1/2017 | Hu | |
| 2017/0187666 A1* | 6/2017 | Schmid | H04L 67/02 |
| 2017/0195128 A1 | 7/2017 | Ng | |
| 2017/0331952 A1 | 11/2017 | Rogers | |
| 2018/0188905 A1* | 7/2018 | Tran | G06F 3/0482 |
| 2018/0192141 A1* | 7/2018 | Akumiah | H04L 51/10 |
| 2018/0295089 A1 | 10/2018 | Patil | |
| 2019/0005024 A1* | 1/2019 | Somech | H04L 51/36 |
| 2019/0082000 A1* | 3/2019 | Hurst | H04N 21/64769 |
| 2019/0121501 A1* | 4/2019 | Laska | H04N 21/2187 |
| 2020/0104017 A1* | 4/2020 | Tran | H04L 51/10 |
| 2020/0153766 A1* | 5/2020 | Parr | G06Q 10/101 |

OTHER PUBLICATIONS

IBM, "List of IBM Patents or Patent Applications Treated as Related (Appendix P)," Sep. 14, 2020, p. 1-2.
U.S. Appl. No. 15/700,629, entitled "Response Status Management", filed Sep. 11, 2017, IN920160412US02, 51 Pages.

* cited by examiner

RESPONSE STATUS MANAGEMENT IN A SOCIAL NETWORKING ENVIRONMENT

BACKGROUND

This disclosure relates generally to computer systems and, more particularly, relates to response status management in a social networking environment. Social networking environments may facilitate communication between physically separated users. The number of messages in a social networking environment is increasing. As the number of messages increases, the need for response status management in a social networking environment may also increase.

SUMMARY

Aspects of the disclosure relate to monitoring actions of a recipient of a message and analyzing or relating messages from the sender of a message in order to auto-generate a response or an indication of action by the recipient. Response status management may allow a sender of a message to wait for a response only if the recipient is preparing for a response. Actions of a recipient correlating to the received message may be monitored to auto-generate a response status for the sender. A response status may be predicted based on the delegated actions by the recipient and generated for the sender. The sender may be provided with a status message to indicate if a response from the recipient will be received. The status message may be generated based on the actions of the recipient. The actions may be analyzed to auto-generate a runtime status response for the sender.

Disclosed aspects relate to response status management in a social networking environment. A message from a source user to a recipient user may be detected in the social networking environment in response to a triggering event, wherein the triggering event is the recipient user being added to a guest list, and wherein the message is a party invitation. A set of message response actions related to the recipient user may be identified. A response status may be determined based on the set of message response actions, wherein the response status relates to the recipient user. An indication of the response status may be provided to the source user, wherein the indication includes a gif video indicator.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
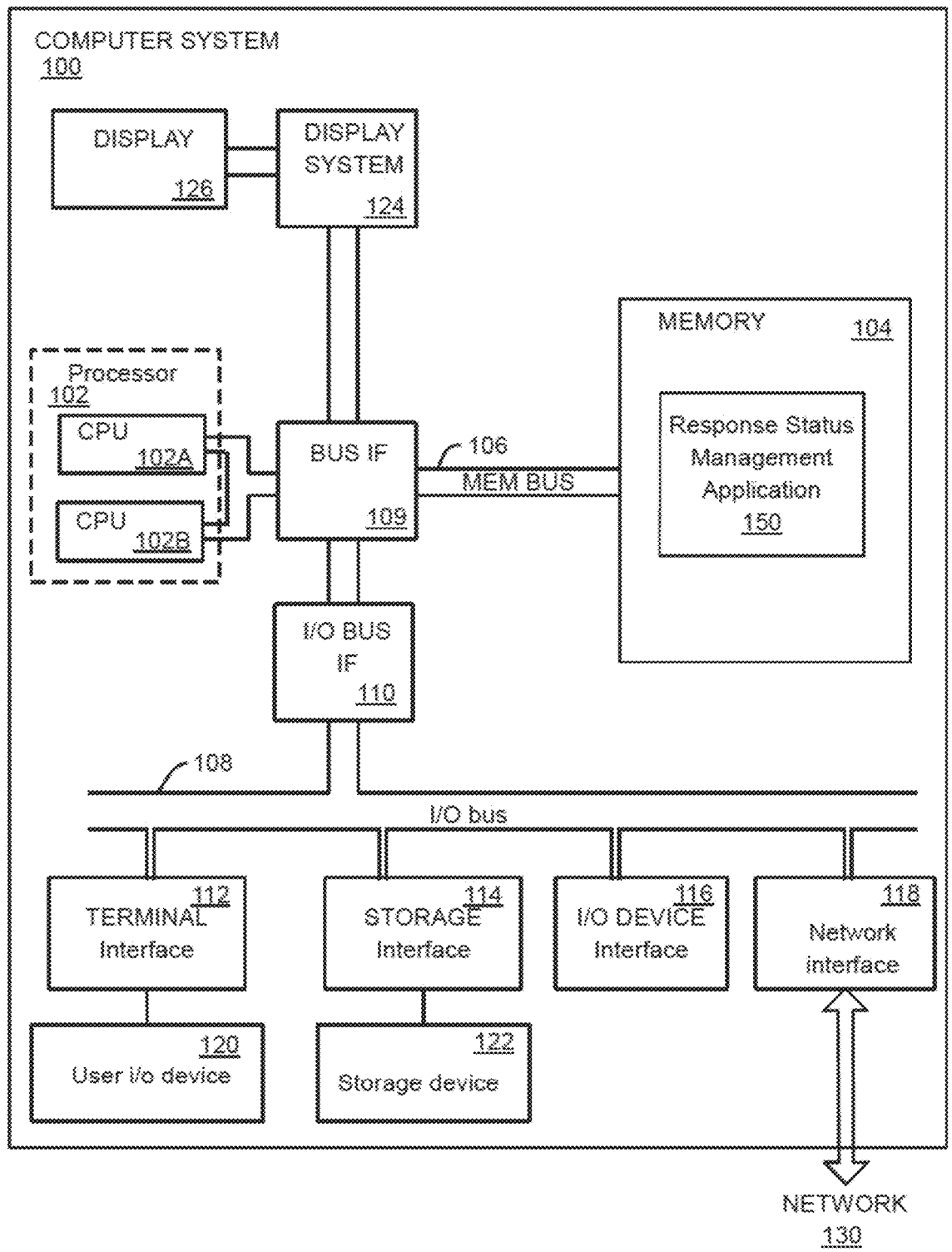
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to monitoring actions of a recipient of a message and analyzing or relating messages from the sender of a message in order to auto-generate a response or an indication of action by the recipient. Response status management may allow a sender of a message to wait for a response only if the recipient is preparing for a response. Actions of a recipient correlating to the received message may be monitored to auto-generate a response status for the sender. A response status may be predicted based on the delegated actions by the recipient and generated for the sender. The sender may be provided with a status message to indicate if a response from the recipient will be received. The status message may be generated based on the actions of the recipient. The actions may be analyzed to auto-generate a runtime status response for the sender.

Users of social networking environments may have busy schedules. It may be difficult for the sender of a message to determine actions performed by the recipient in order to respond to the message. The sender (e.g., source user) may wait for a response from a recipient user without knowing if the recipient has even seen or read the message. In certain situations, a recipient may not answer right away because the recipient needs time to research or find a correct response for the source user. In a business environment, it may be inefficient for colleagues to speculate if a response is coming. The source user or users may desire an indication, such as a baseline expectation, of whether or not the recipient is responding to the message. Response status management may indicate to a source user if the recipient has (or has not) seen the message, is preparing a response, or is not in a situation to respond to the source user in the immediate future. A source user may be provided with a display of a status message which may indicate a predicted response or predicted response timeline. The status message may be based on the actions of the receiver. The actions of the receiver may be analyzed to auto-generate a status response for the source user.

Aspects of the disclosure relate to a system, method, and computer program product for response status management in a social networking environment. A message from a source user to a recipient user may be detected in the social networking environment. A set of message response actions related to the recipient user may be identified. A response status may be determined based on the set of message response actions. An indication of the response status may be provided to the source user.

In certain embodiments, the message from the source user may be detected, including calendar-oriented requests, information-oriented requests, and/or approval-oriented requests. The set of message response actions may be identified related to the recipient user. In certain embodiments, the message response actions can include a set of accessed information, a set of recipient user activities, or inactivity of a recipient user. The message response actions may be utilized to determine a response status. In various embodiments, the response status may include a nature of a set of response operations, an anticipated response, and/or an expected response time. The response status may be provided to the user as text, a still image, a video, an audio indication, a tactile indication, or other indicators. Altogether, aspects of the disclosure can have performance or efficiency benefits. Aspects may save resources such as network bandwidth, time, processing, or memory. As an example, bandwidth may be saved by providing an indication of a response status to a source user. The response status may prevent a source user from repeatedly monitoring the social networking environment for a response from the recipient user. The repeated monitoring may waste bandwidth. Other examples of using response status management to save bandwidth may also be possible.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a response status management application 150. In embodiments, the response status management application 150 may include instructions or statements that execute on the processor 102 or instructions or statements that are interpreted by instructions or statements that execute on the processor 102 to carry out the functions as further described below. In certain embodiments, the response status management application 150 is implemented in hardware via semiconductor devices, chips, logical gates, circuits, circuit cards, and/or other physical hardware devices in lieu of, or in addition to, a processor-based system. In embodiments, the response status management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
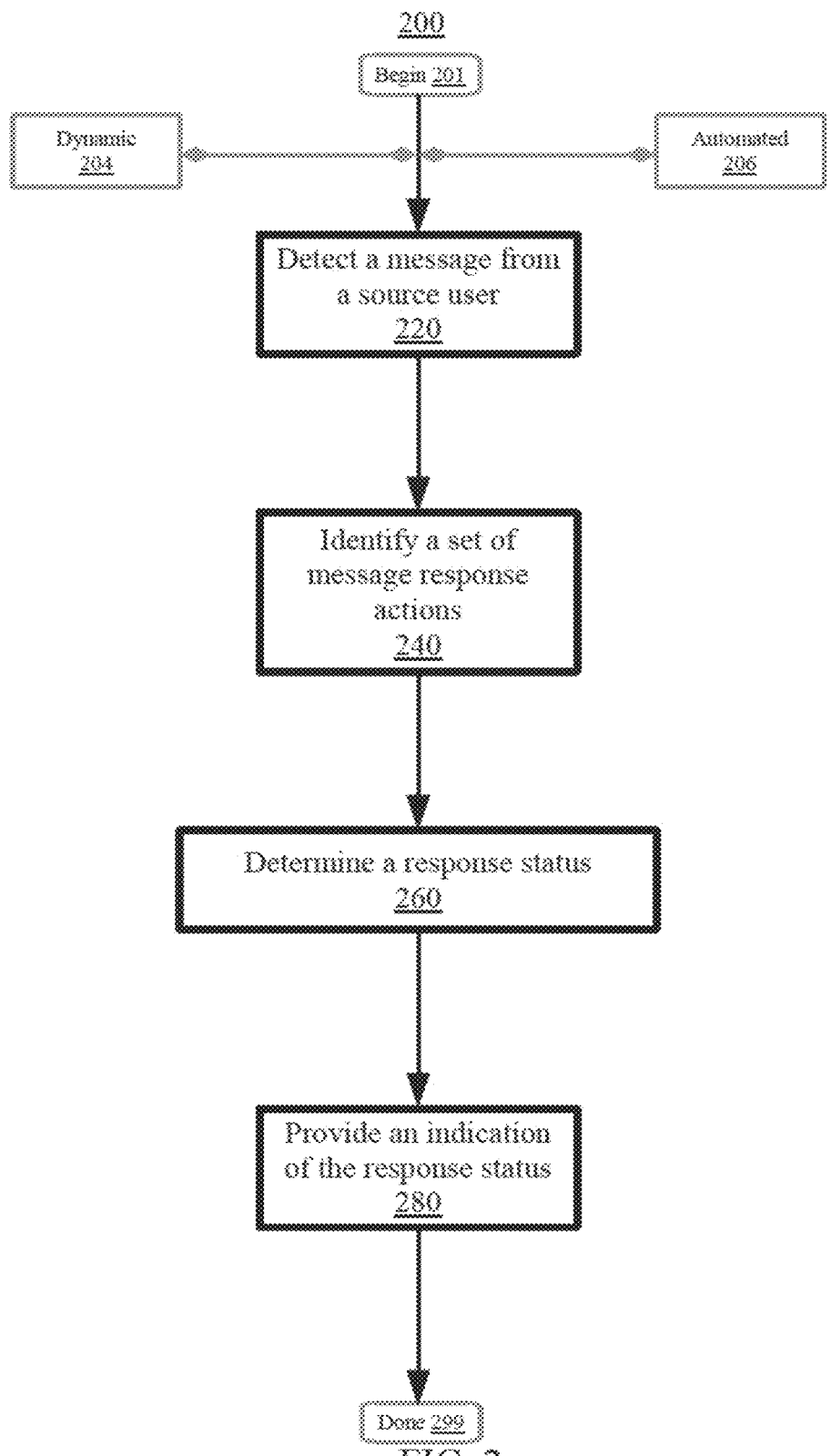
FIG. 2 is a flowchart illustrating a method for response status management in a social networking environment, according to embodiments.

FIG. 2 is a flowchart illustrating a method 200 for response status management in a social networking environment, according to embodiments. Aspects of FIG. 2 relate to monitoring and analyzing the actions of the recipient of a message in a social networking environment. Generally, social networking environments can include platforms that offer communication tools to facilitate the sharing of information, ideas, pictures, video, messages, and other data between a community of users. As examples, social networking environments may include one or more of instant messaging platforms (e.g., chat service), short messaging services (e.g., text messaging), social communities (e.g., micro-blog, professional connections, photo-sharing, other groups of users), newsfeeds (e.g., interface for reception and display news events and activity data), email platforms (e.g., internet or other network-based messaging tool), calendars (e.g., shared calendar platform), product reviews (e.g., collection of user reviews), project collaborations (e.g., a group of users working together on a task), or the like. The method 200 may begin at block 201.

In embodiments, the detecting, the identifying, the determining, the providing, and the other steps described herein may each be executed in a dynamic fashion at block 204. The steps described herein may be executed in a dynamic fashion to streamline response status management in the social networking environment. The set of operational steps may occur in real-time, ongoing, or on-the-fly. As an example, one or more of the operations steps described herein may be carried-out in an ongoing basis to facilitate, promote, or enhance response status management in a social networking environment. Other examples may also be possible.

In embodiments, the detecting, the identifying, the determining, the providing, and the other steps described herein may each be executed in an automated fashion at block 206. The steps described herein may be executed in an automated fashion without user intervention. The operational steps may each occur in an automated fashion without user intervention or manual action (e.g., using automated computer machinery, fully machine-driven without manual stimuli). The automated operational steps may be performed by a response status management engine (e.g., as part of a response status management system), a cloud management engine (e.g., as part of a cloud environment), or the like.

At block 220, a message may be detected. Generally, detecting can include sensing, receiving, recognizing, identifying, or discovering. The message can include an instant message (IM), an email, a calendar event, a short message service (SMS) message, a blog post, a photo message, a video message, a newsfeed post, a project, a product review, or the like. The message may be from a source user to a recipient user. As an example, the message may be sent from a first user or group of users to a second user or group of users in the social networking environment. The detecting may be performed in the social networking environment. The message may be sensed in response to a triggering event (e.g., the opening of a new message window, the opening of an application, the sending of a message) or a user input (e.g., entering message content). The message may be detected automatically (e.g., without manual intervention) by the response status management engine. The response status management engine may dynamically (e.g., ongoing, on-the-fly) detect or identify a message.

Consider the following example. User A may send a party invitation to User B via a social networking environment such as a social media website. The party invitation may be sent as an email. User A may send an email to User B with information regarding the party. The response status management engine may automatically detect the receiving of the email by User B when the email arrives in the inbox of User B. In another example, the party invitation may be sent as a calendar event on a social media website. User A may create a calendar event for the party and add User B to the guest list. The response status management engine may detect the message from User A in response to (e.g., a triggering event) User B being added to the guest list. Other examples of detecting a message from a source user to a recipient user may also be possible.

At block 240, a set of message response actions may be identified. Generally, identifying can include recognizing, discovering, distinguishing, ascertaining, or determining. The set of message response actions may include activities of a first user with respect to a feedback, reply, or acknowledgment of a message from another user. The set of message response actions may include accessed information (e.g., gathering information/material for a response), user activity (e.g., preparing/performing the response), inactivity (e.g., no actions, recipient user is away from the computing device), or the like. The set of message response actions may be related to the recipient user. The set of message response actions may include the actions of the recipient user (e.g., how the recipient responds to a message). The set of message response actions may include the actions of a delegate of the recipient user (e.g., executive/personal assistant of the recipient).

Consider the following example. User A has sent User B an invitation to a party via a calendar event on a social media website. The response status management engine has detected the message in the social networking environment. A set of message response actions may be identified. User B may open the calendar application on their mobile device to determine whether or not the user is available on the day of the party. User B may decide to attend the party and begin typing a comment on the calendar event page. These actions performed by User B may be identified by the response status management engine in order to indicate to the source user a message response status. In another example, User B may not see the calendar event invitation (e.g., User B is not logged on to their social networking environment, User B is away from their computing device). This may indicate inactivity, or a lack of a response action by User B. The lack of action performed by User B may be identified by the response status management engine in order to indicate to User A a message response status. Other examples of identifying a set of message response actions may also be possible.

At block 260, a response status may be determined. Generally, determining can include formulating, resolving, ascertaining, identifying, or establishing. A response status may include properties or information (e.g., possible responses, time-related data, pace of response, actions performed in order to respond) related to a response from a user. The response status may include a response status prediction, a nature of a set of response operations (e.g., commands, buttons pressed), an anticipated response (e.g., yes/no, time, value), an expected response value (e.g., response will be sent in five minutes, response will be sent tomorrow), or the like. The response status may be determined based on the set of message response actions. The response status may be determined by analyzing the set of message response actions. As an example, message response actions may be extracted, examined, or classified in order to discover useful information and suggest conclusions related to the response status.

Consider the following example. The message response actions of User B (as described herein) may indicate that User B will attend the party and is typing a response (e.g., User B checked the calendar application and began typing a comment). A response status may be determined based on the message response actions of User B. The response status management engine may detect that User B has opened their calendar application and selected the date of the party. Based on User B checking the calendar application, the response status management engine may determine that User B is in the process of responding to the invitation. Due to the lack of appointments for the day of the party (as indicated by zero inputs in the calendar application for the day of the party), an anticipated response for User B may include an RSVP of yes/attending. The response status management engine may detect no input for the day of the party and determine that User B will be able to attend. User B may begin typing a comment in the RSVP section of the event page. The RSVP section may include (yes/no/unsure) boxes to check before leaving a comment. User B may check the "yes" box and begin typing. Since User B is currently typing a comment, a response may be expected to be received within a certain time period (e.g., two minutes). The determined response status with respect to User B may include an indication that User B checked their calendar, has no appointments, and is currently typing a response to User A. Other examples of determining a response status based on the set of message response actions may also be possible.

At block 280, an indication of the response status may be provided to the source user. Generally, providing can include transmitting, conveying, presenting, displaying, sending, indicating, marking, or generating. An indication of the response status may include a signal or designation which specifies or denotes the response status of the recipient user. The indicator may signal to the source user if/that the message is being responded to by the recipient user. The indication may be provided to the source user as text in a status bar (e.g., "recipient is typing", "message will be received soon"). The text may indicate the response status to the source user in words and phrases. The indication may include a still image indicator (e.g., a photo/icon), a video indicator (e.g., a video/moving image), an audio indicator (e.g., a sound), a tactile indicator (e.g., signal perceived by touch), or other indicators.

Consider the following example. As described herein, User A may send a party invitation to User B via a calendar event. User B may open a calendar application and begin typing a comment. The response status for User B may indicate that User B has checked their calendar, has no appointments, and is currently typing a response to User A via the comment section for the event. An indication of this response status may be provided to User A. A textbox may appear in the social networking environment of User A which indicates that User B is typing a response. The indication may include a still image, such as a profile picture of User B. The indication may include a video image, such as a live webcam video of User B. The indication may include an audio indicator, such as a beeping sound. The indication may include a tactile indicator, such as a vibration of a cell phone. The text, image, video, sound, or movement may indicate to User A the response status of User B. In another example, if User B is away from their computing device and has not seen the invitation, this may also be indicated to User A. User A may receive a text notification (e.g., "User B has not opened the message yet" in the status bar of User A) that indicates that User B has not yet seen the invitation. Other examples of providing an indication of the response status to the source user may also be possible.

Method 200 concludes at block 299. Aspects of method 200 may provide performance or efficiency benefits related to response status management in a social networking environment. Aspects may save resources such as bandwidth, processing, or memory. As an example, providing an indication of the response status to the source user may save bandwidth. Without an indication of the response status, a source user may manually check the social networking environment for a message response, which may waste bandwidth if the recipient user is slow to respond to the message. By providing the source user with an indication of the response status, bandwidth may be saved. Other examples of saving bandwidth may also be possible.

Figure 3:
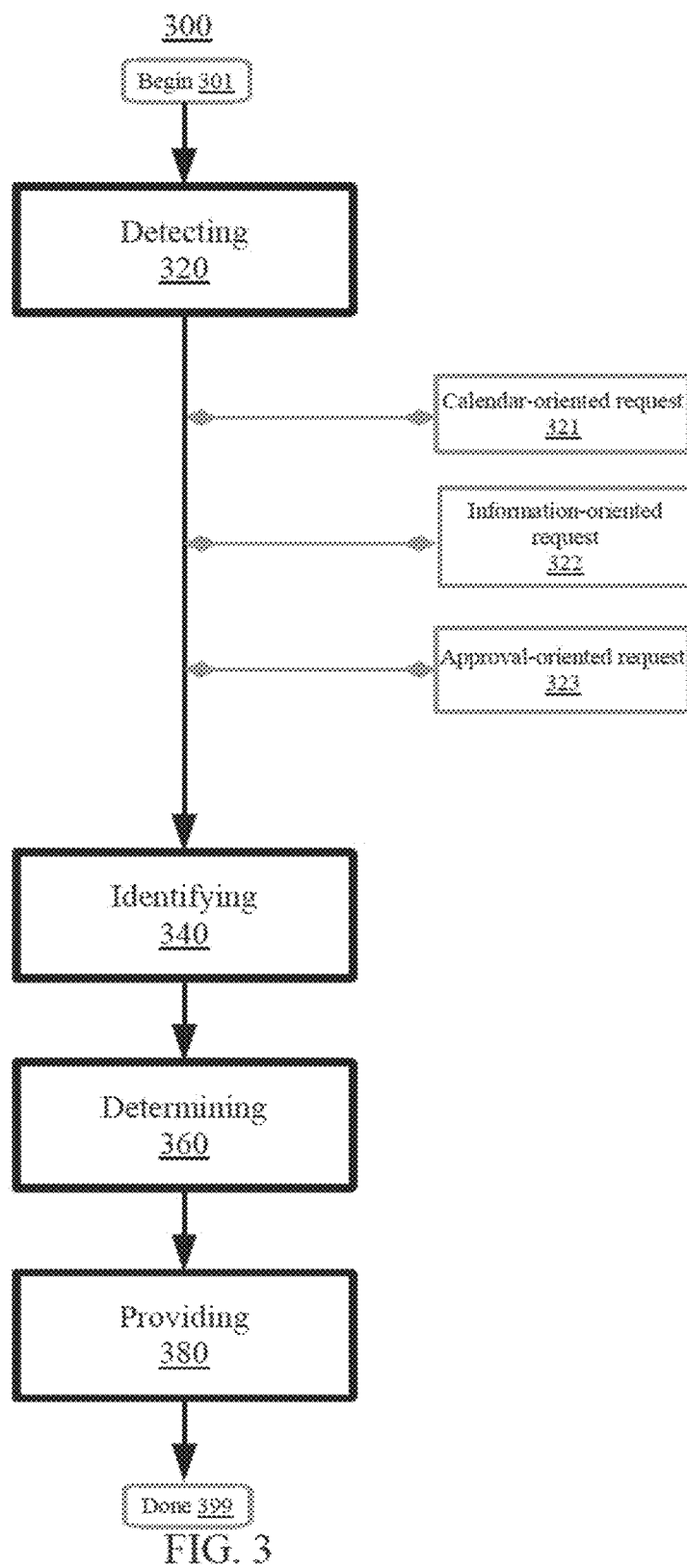
FIG. 3 is a flowchart illustrating a method for response status management in a social networking environment, according to embodiments.

FIG. 3 is a flowchart illustrating a method 300 for response status management in a social networking environment, according to embodiments. Aspects of method 300 may be similar or the same as aspects of method 200, and aspects may be utilized interchangeably. The method 300 may begin at block 301. At block 320, a message may be detected. The message may be from a source user to a recipient user. The detecting may be performed in the social networking environment.

In embodiments, a calendar-oriented request from the source user to the recipient user may be detected at block 321. Generally, detecting can include sensing, receiving, recognizing, identifying, or discovering. The calendar-oriented request may include a message related to an event, invitation, or scheduling application. The calendar-oriented request may include an invitation to a meeting, party, or the like. The calendar-oriented request may include an event such as a sporting event, a concert, a vacation, or the like. The calendar-oriented request may include appointment scheduling such as a medical appointment, a class schedule, or the like. The calendar-oriented request may include information or data related to the event, invitation, or appointment such as available dates and times (e.g., Thursday, 4 p.m), other invited users (e.g., other coworkers, classmates, friends), an RSVP date (e.g., response needed by Friday), or the like. The detecting may be performed in the social networking environment as described herein. As an example, key words or characters (e.g., "Wednesday", "appointment", "schedule", "2 p.m.") may be collected or identified in the message. The key words or characters may relate to a calendar-oriented request.

Consider the following example. A company may use a response status management engine to schedule a meeting. An email may be sent from the department head (source user) to the members of the department invited to meeting (recipient users). The message from the department head may include a calendar-oriented request (e.g., an invitation to the meeting). The email may also indicate that the department head wants to schedule the meeting for Monday at 2:30 P.M. The email may include a list of all invited colleagues as well an RSVP date (e.g., "Please respond by Friday at 5 P.M."). These key phrases, words, and dates may be detected in the email from the department head. As the colleagues receive and respond to the email, the various response statuses may be provided to the department head. As an example, a first colleague may see the email right away and respond immediately. As the first colleague is typing their response, the response status (e.g., "currently responding") may be indicated to the department head. Other examples of detecting a calendar-oriented request may also be possible.

In embodiments, an information-oriented request from the source user to the recipient user may be detected at block 322. Generally, detecting can include sensing, receiving, recognizing, identifying, or discovering. The information-oriented request may include specific answers, responses, or the like requested from the recipient user. As an example, the source user may send an inquiry (e.g., via email, via instant message) to the recipient user (e.g., subject matter expert) for specific information (e.g., the recipient is an expert on this subject matter, the recipient has access to a particular database). The message may necessitate or desire a response to a question. The detecting may be performed in the social networking environment as described herein. As an example, key words or characters (e.g., "check the database", "question") may be collected or identified in the message. The key words or characters may relate to an information-oriented request.

Consider the following example. A retail store may use a response status management engine while processing online orders. A customer (e.g., source user) may place an order for a pair of shoes and inquire when their shipment will be arriving. An information-oriented request may be detected in the message from the customer. The customer may request or require specific a specific answer or response from the recipient user related to their shipment inquiry. As an example, the shipment may have been due to arrive the previous day and the customer is inquiry why they have not received the shoes yet and where the shoes are currently located. The warehouse manager for the retail store (e.g., recipient user) may receive the inquiry and check the warehouse database for the location and shipment information for the particular customer. The response status (e.g., "checking the database") may be indicated to the customer while the warehouse manager researches in order to appropriately respond to the source user. Other examples of detecting an information-oriented request may also be possible.

In embodiments, an approval-oriented request from the source user to the recipient user may be detected at block 323. Generally, detecting can include sensing, receiving, recognizing, identifying, or discovering. The approval-oriented request may include a required or desired agreement or acceptance by a recipient user. The approval-oriented request may include an employee seeking approval from a boss/manager (e.g., to take action), a minor seeking approval from a parent/guardian (e.g., to go to a friend's house), a student seeking approval from a teacher (e.g., a question on an assignment), or the like. The approval-oriented request may include a binary request (e.g., select yes/no, select 1/0), a free-response request (e.g., an open-answer question), a hybrid request (e.g., select yes/no and then explain why/why not), or the like. The approval-oriented request may include boxes to be selected/checked, a comment section to leave an answer, or the like. The detecting may be performed in the social networking environment as described herein. As an example, key words or characters (e.g., "approval needed") may be collected or identified in the message. The key words or characters may relate to an approval-oriented request.

Consider the following example. A medical environment may use a response status management engine to respond to patient requests and messages. A particular patient (e.g., the source user) may send an email to the office of their doctor. The patient may need the doctor to fill a prescription. The secretary (e.g., delegate) of the doctor (e.g., recipient user) may receive the prescription refill request from the patient. The email may include an approval-oriented request. The patient may need the approval of the doctor in order to fill the prescription. The secretary may forward the email to the doctor and this action may be provided to the patient to indicate the response status (e.g., "request has been sent to doctor"). When the doctor approves the refill, the response status may be provided to the patient (e.g., "doctor has approved request"). Other examples of detecting an approval-oriented request may also be possible.

At block 340, a set of message response actions may be identified. The set of message response actions may be related to the recipient user. At block 360, a response status may be determined. The response status may be determined based on the set of message response actions. At block 380, an indication of the response status may be provided to the source user. Method 300 concludes at block 399. Aspects of method 300 may provide performance or efficiency benefits related to response status management in a social networking environment. Aspects may save resources such as bandwidth, processing, or memory. As an example, processing may be saved by detecting the type or kind of message in the social networking environment. Specific types or kinds of messages may require different message response actions. By detecting the type or kind of message, a recipient user may narrow down the necessary message response action (e.g., checking a calendar instead of seeking an approval). This may require less processing. Other examples of saving processing may also be possible.

Figure 4:
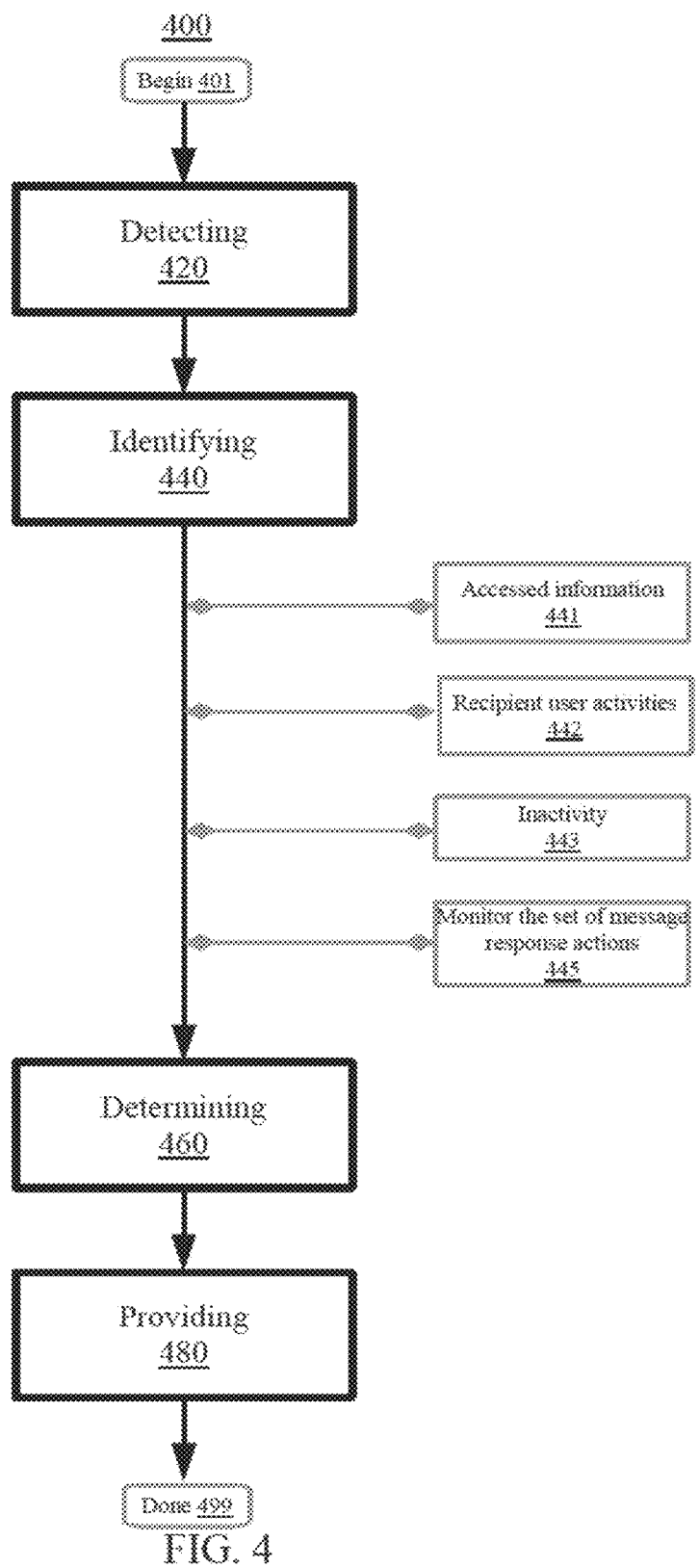
FIG. 4 is a flowchart illustrating a method for response status management in a social networking environment, according to embodiments.

FIG. 4 is a flowchart illustrating a method 400 for response status management in a social networking environment, according to embodiments. Aspects of method 400 may be similar or the same as aspects of method 200/300, and aspects may be utilized interchangeably. The method 400 may begin at block 401. At block 420, a message may be detected. The message may be from a source user to a recipient user. The detecting may be performed in the social networking environment. At block 440, a set of message response actions may be identified. The set of message response actions may be related to the recipient user.

In embodiments, a set of accessed information may be identified at block 441. Generally, identifying can include recognizing, discovering, distinguishing, ascertaining, or determining. The set of accessed information may include the gathering and preparing of the material, data, or the like in order to respond to a message from a source user. The set of accessed information may include the opening of a calendar or database, a read or write command in a database, opening a number or combination of databases, or the like. The set of accessed information may include structured data (e.g., data from a table in a database), unstructured data (e.g., electronic articles/resources, handwritten and scanned documents), or the like. The set of accessed information may relate to the recipient user (e.g., performed/gathered by the recipient user/delegate of the recipient user). The set of accessed information may indicate whether or not the recipient user is looking into the request and/or preparing to respond to the message. The identifying may be performed in response to detecting the message.

Consider the following example. A response status management engine may be used in a document-sharing environment. Two students may be collaborating on a project using a document-sharing website. Student A (e.g., source user) may send an instant message via the website to Student B (e.g., recipient user) asking a question about a particular topic for the project (e.g., World War I). Student B may open an Internet search and/or a database in order to respond to the instant message. The response status for Student B may include the research (e.g., start Internet search, start database search, start Internet and database searches). The response status of Student B may be provided to Student A to indicate to Student A that Student B is about to perform research to answer the instant message. A textbox may appear in the social networking environment of Student A which says "Student B has opened a database for information on World War I." Other examples of identifying a set of accessed information related to the recipient user may also be possible.

In embodiments, a set of recipient user activities may be identified at block 442. Generally, identifying can include recognizing, discovering, distinguishing, ascertaining, or determining. The set of recipient user activities may include the preparing and performing of a set of operations in order to respond to a message from a source user. The set of recipient user activities may include putting together information from a database, opening an application (e.g., text messaging, email), preparing the message (e.g., typing a response), a set of commands/operations related to the recipient user (e.g., Standard Query Language commands), participating in another communication with another user (e.g., recipient user makes a phone call/sends an email/speaks with another user in order to gather more information to respond to the request), preparing an environment (e.g., ordering supplies, sending a shipment, setting-up a room), or the like. The set of recipient user activities may relate to the recipient user (e.g., performed by the recipient user). The identifying may be performed in response to detecting the message.

Consider the following example. A food delivery service may use a response status management engine to communicate to customers the status of their delivery. A customer (e.g., source user) may order a pizza. The pizza restaurant may receive the message from the source. The pizza restaurant may open an application to indicate the delivery status to the customer. As an example, when the GPS application of the delivery driver is opened, the set of recipient user activities may include that the delivery is on its way (e.g., the driver is using GPS directions). The recipient user activities may include the specific GPS location of the driver, a dashboard camera indication the location of the driver, and a camera in the kitchen of the restaurant so the customer can monitor the progress of their delivery. The set of recipient user activities may indicate to the customer that the restaurant is performing a set of operations to deliver the pizza. Other examples of identifying a set of recipient user activities may also be possible.

In embodiments, inactivity may be identified at block 443. Generally, identifying can include recognizing, discovering, distinguishing, ascertaining, or determining. Inactivity may include a lack of action of a recipient user in a social networking environment. In various embodiments, the recipient user may be away from their computer, cell phone, or the like. The response status management engine may detect a lack of activity from the recipient user (e.g., the recipient has zero applications open, the device of the recipient is turned off, the device of the recipient is in a different physical location than the recipient). In certain embodiments, the inactivity may include a change in action of a user. As an example, a recipient user may begin a response to a message but become distracted or interrupted with another message or task. The response status management engine may detect that the recipient has stopped typing or stopped viewing the message and identify a state of inactivity. In various embodiments, the recipient user may have detection of their actions turned off. The recipient user may use a predetermined setting or mode on their computing device to prevent the source user from being notified of the response status. The inactivity may relate to the recipient user. The identifying may be performed in response to detecting the message.

Consider the following example. A company may use a response status management engine. A worker may need approval from their department head in order to attend a business trip. The worker may send an email and indicate that they need a response from the department head by 5 P.M. on Friday. The email may be detected in the email inbox of the department head on Tuesday, but the department head may not see the email right away. The lack of activity (e.g., in response to the email) by the department head may be indicated to the worker. The worker may be provided with an indication such as a text box reading "has not been read" or an icon of a red X. On Thursday afternoon, the indication of the response status may still indicate inactivity. The worker may be provided with this indication and may wish to contact the department head with their request again. Other examples of identifying inactivity in response to detecting the message may also be possible.

In embodiments, the set of message response actions may be monitored at block 445. Generally, monitoring can include tracking, listening, observing, checking, watching, detecting, recognizing, or discovering. Monitoring the set of message response actions can include capturing commands, keystrokes, touchscreen touches or pushes, swipes, mouse-movement, eye-gazing, or other activities. The monitoring may be performed using a set of sensor devices. The set of sensor devices may include a video camera (e.g., camera/webcam recording activity of a recipient), a still image camera (e.g., camera/webcam capturing images of a recipient), a motion detector (e.g., tracking movement of a recipient), a touch/feel/tactile detector (e.g., keyboard detecting keystrokes, computer mouse detecting clicks, touchscreen recognizing touches), a camera sensor (e.g., facial expression/recognition), or the like. The set of message response actions may relate to the recipient user (e.g., accessed information/user activities/inactivity of the recipient). By monitoring the action or lack of action of a recipient user, the response status management engine may observe or track the response or lack of a response to a message by the recipient user and provide the source user with an indication of if/when the response may be received. As an example, two students collaborating on a group project may send instant messages to one another. A webcam may record the activity of the recipient student in order to indicate to the source student whether or not a response is being prepared. Other examples are also possible.

Consider the following example. A customer may contact a customer service department which utilizes a response status management engine. The customer (e.g., source user) may initiate an instant message chat with a customer service representative (e.g., recipient user). The customer service representative may perform a set of message response actions in order to respond to the customer complaint. The message response actions may be monitored using a set of sensor devices. As an example, a tactile detector may register keyboard keystrokes which indicate that the customer service representative is typing. A motion detector may register movement of the customer service representative (e.g., the representative has left their desk to consult with a superior). The set of sensors may provide information to the customer regarding the set of message response actions of the representative. An indication of the response status may be provided to the customer (e.g., "representative is typing"). Other examples of monitoring the set of message response actions using a set of sensor devices may also be possible.

At block 460, a response status may be determined. The response status may be determined based on the set of message response actions. At block 480, an indication of the response status may be provided to the source user. Method 400 concludes at block 499. Aspects of method 400 may provide performance or efficiency benefits related to response status management in a social networking environment. Aspects may save resources such as bandwidth, processing, or memory. As an example, monitoring the set of message response actions may save bandwidth. The response status management engine may track or observe the response action of the recipient user and notify the source user of the response status. This may prevent a source user from frequently (e.g., manually) checking or monitoring for a message response, which may waste bandwidth. Other examples of saving bandwidth may also be possible.

Figure 5:
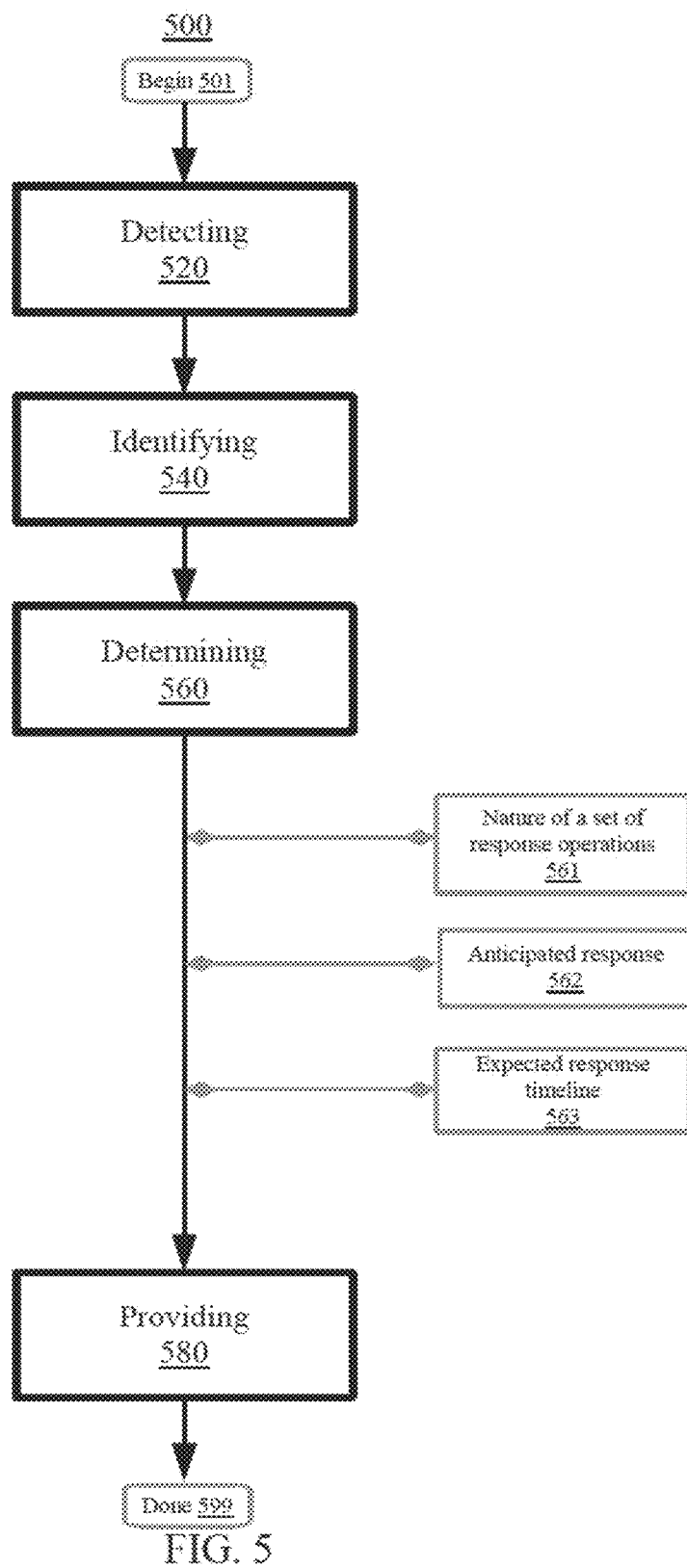
FIG. 5 is a flowchart illustrating a method for response status management in a social networking environment, according to embodiments.

FIG. 5 is a flowchart illustrating a method 500 for response status management in a social networking environment, according to embodiments. Aspects of method 500 may be similar or the same as aspects of method 200/300/400, and aspects may be utilized interchangeably. The method 500 may begin at block 501. At block 520, a message may be detected. The message may be from a source user to a recipient user. The detecting may be performed in the social networking environment. At block 540, a set of message response actions may be identified. The set of message response actions may be related to the recipient user. At block 560, a response status may be determined. The response status may be determined based on the set of message response actions.

In embodiments, a nature of a set of response operations may be determined at block 561. Generally, determining can include formulating, resolving, ascertaining, identifying, or establishing. The nature of a set of response operations may include various actions, commands, or the like of possible substantive responses. The nature of a set of response operations may include types or kinds of actions being performed by the recipient user in order to respond to a message from a source user. The nature of a set of response operations can include entering a command/query in a database (e.g., search, order by), asking for approval from a superior (e.g., a boss/department head), asking for more information (e.g., responding with a question, consulting a professional), performing research (e.g., in a database, historical data for source user), contacting a reference (e.g., calling/emailing another person), or the like. The determining may be performed based on the set of message response actions. The determining may be performed in response to a triggering event (e.g., the opening of an application, the entering of a query), by comparing with a benchmark/baseline/known operation (e.g., recipient user needs a baseline of 3 query operations/5 telephone conversations/2 approvals in order to respond to a message), searching a database or table of response actions, or the like.

Consider the following example. A patient in a medical environment may be experiencing health problems and may press a button to request a doctor (e.g., send a message to a physician assistant). The physician assistant may receive the request and may begin message response actions. As an example, the physician assistant may need to submit a request for a doctor, search a database for patient chart history, and determine the location of the patient. The nature of the set of response operations may be determined to indicate a response status to the patient. The patient may be provided with the nature of the response operations by the physician assistant. As an example, the patient may be notified that the assistant has submitted a request for a doctor, the assistant has searched/accessed chart history, and the assistant has searched for the location of the patient. The notification may allow the patient to realize that the request has been seen by the physician assistant and is being processed. Other examples of determining a nature of a set of response operations may also be possible.

In embodiments, an anticipated response may be determined at block 562. Generally, determining can include formulating, resolving, ascertaining, identifying, or establishing. The anticipated response may include an expected, predicted, or likely answer (from a recipient user) to a message (from a source user). The anticipated response can include what the response is expected to be (e.g., yes/no), an expected time for a meeting, a value from a database, or the like. The anticipated response may be determined from historical data of a recipient user (e.g., what the recipient typically responds to similar messages). The determining may be performed based on the set of message response actions. The anticipated response may be determined based on calendar data (e.g., the source user wants to meet on Thursday and the recipient user is only free before 11 A.M.). The anticipated response may be based on actions of a user (e.g., the user viewed a specific table in a database). The determining may be performed in response to a triggering event (e.g., the selecting of an item from a list/menu of options), by comparing with a benchmark/baseline/known operation (e.g., recipient user is known to respond "yes" to similar messages), searching a database or table of response actions, or the like.

Consider the following example. A university may utilize a portal with a response status management engine for communication between students and professors. A student (e.g., source user) may send a message to a professor (e.g., recipient user). The student may wish to make an appointment with the professor on Wednesday for extra study help. The professor may receive the message from the student and check their calendar application for an available time. The calendar application of the professor may indicate free time between 1:00 and 3:30 P.M. Based on this calendar information, an anticipate response from the professor may be determined. A notification may be provided to the student indicating that the professor is free during this time and will likely be able to meet then. Another student may send a message to the professor asking for presentation slides from a particular class that this student missed. The professor may be unable to share presentation slides with students who have missed a class due to university policy. Historical data from the portal account of the professor may indicate that the professor frequently answers "no" to similar emails. A notification may be provided to the second student indicating that the professor is anticipated to be unable to share the presentation slides. Other examples of determining an anticipated response may also be possible.

In embodiments, an expected response timeline may be determined at block 563. Generally, determining can include formulating, resolving, ascertaining, identifying, or establishing. The expected response timeline may include an anticipated or predicted schedule or outline when (one or more stages of) a response may be received. The expected response timeline may include the stage of completion a message response is currently in (e.g., recipient is typing, recipient response is 75% complete, number of forms completed), an expected time (e.g., response should be received at 4:05 P.M., response should be received in 2 minutes), or the like. The determining may be performed based on the set of message response actions. The expected response timeline may relate to time-oriented data of a response action. The expected response timeline may be determined based on timestamp information (e.g., message was read at 2:18 P.M., application was opened 30 minutes ago), historical time-oriented response data (e.g., recipient generally/on average takes 20 minutes to respond to a message), or the like. The determining may be performed in response to a triggering event (e.g., the opening of an application, the entering of a query), by comparing with a benchmark/baseline/known operation (e.g., recipient user needs a baseline of 15 minutes to reply to a message), searching a database or table of response actions, based on pace information (e.g., number of words typed per minute), motion detectors (e.g., webcam sensors, keyboard sensors), or the like. As an example, a hiring manager may send a message to three department heads requesting approval for a new hire. Historical data from these three department heads may indicate that similar requests take (on average) four days for approval. The hiring manager may be provided with an expected response timeline indicating that the approval should be processed within four days. Other examples may also be possible.

Consider the following example. A ride sharing application may use a response status management engine. A user may request a ride via the application and a driver may receive the ride request. The driver may open a GPS application in order to pick up the rider. The GPS application may be an indicated message response action. The rider may be provided with an indication that the driver has started navigating and be provided with an expected time of arrival via the GPS application (e.g., the ride sharing application and GPS application may indicate that the driver will arrive in 15 minutes). As another example, the driver may get lost despite the GPS directions. The ride sharing application and GPS application may indicate a new expected time of arrival (e.g., the driver will arrive in 25 minutes). Other examples of determining an expected response timeline may also be possible.

At block 580, an indication of the response status may be provided to the source user. Method 500 concludes at block 599. Aspects of method 500 may provide performance or efficiency benefits related to response status management in a social networking environment. Aspects may save resources such as bandwidth, processing, or memory. As an example, determining a nature of or an expected response status may save bandwidth. If a source user is provided with a determined expected response timeline, then the source user may more accurately determine when a response from the recipient user will be received. This may prevent the source user from frequently checking for a response, which may waste bandwidth. Other examples of saving bandwidth may also be possible.

Figure 6:
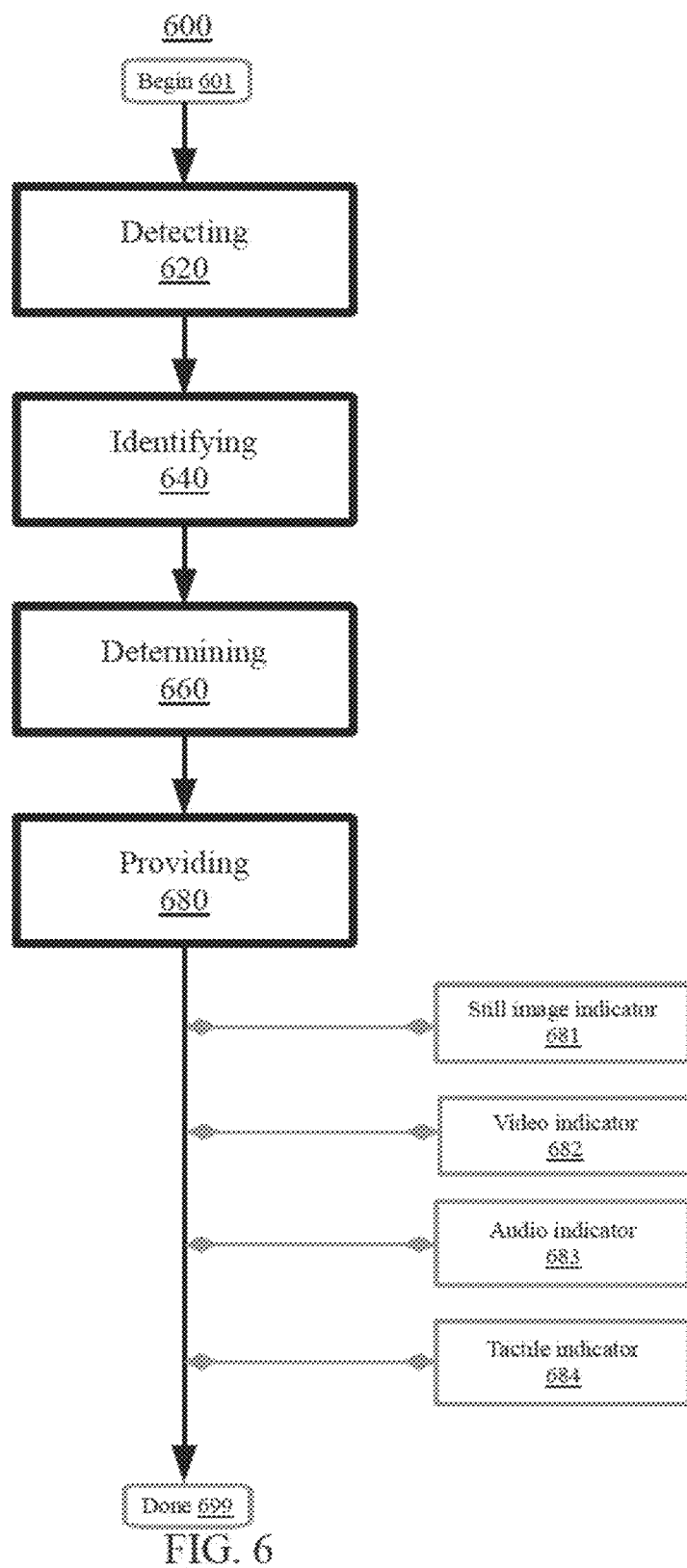
FIG. 6 is a flowchart illustrating a method for response status management in a social networking environment, according to embodiments.

FIG. 6 is a flowchart illustrating a method 600 for response status management in a social networking environment, according to embodiments. Aspects of method 600 may be similar or the same as aspects of method 200/300/400/500, and aspects may be utilized interchangeably. The method 600 may begin at block 601. At block 620, a message may be detected. The message may be from a source user to a recipient user. The detecting may be performed in the social networking environment. At block 640, a set of message response actions may be identified. The set of message response actions may be related to the recipient user. At block 660, a response status may be determined. The response status may be determined based on the set of message response actions. At block 680, an indication of the response status may be provided to the source user.

In embodiments, a still image indicator may be provided to the source user at block 681. Generally, providing can include transmitting, conveying, presenting, displaying, sending, indicating, marking, or generating. The still image indicator may include a picture or photograph signal or designation which specifies or denotes the response status of the recipient user. The still image indicator may include a picture/image (e.g., profile photo of the recipient), icon/clip art image (e.g., pencil, keyboard, speech bubble), symbol (e.g., special character which represents/signifies a response status), or the like. The still image indicator may be provided continually (e.g., displaying the still image when the recipient is responding/about to respond). The still image indicator may flash or enlarge on the computing device screen of the source user. The still imagine indicator may appear in the social networking conversation (e.g., next to the chat/message/email) or next to the recipient user (e.g., in the friends/contact list of the source user). As an example, a user may be waiting for a response to a text message from a friend. While the friend is typing their response, the contact or profile photo of the friend may appear on the mobile phone of the user in order to indicate the response status (e.g., typing). Other examples may also be possible.

Consider the following example. A customer of a retail chain may file a complaint with a customer service representative via an instant messaging service which uses a response status management engine. The customer may be on hold and waiting for a response from the representative. The representative may be working on responding to the complaint by gathering customer purchase history and finding an appropriate department head with which to file the complaint. The representative may need some time to perform these response actions and the customer may question whether or not their complaint is even being processed. In order to indicate to the customer that the representative is acting in response to the complaint, a still image indicator may be provided to the customer. As an example, when the representative is searching for customer history, a clip art image of a computer screen may appear to the customer in the social networking environment, indicating that the representative is researching. When the representative is on the phone with an appropriate department head, a clip art image of a computer screen may appear to the customer, indicating that the representative is on the phone with a superior. When the representative begins typing a response to the customer, a speech bubble icon may appear and flash in the social networking environment of the customer. In this way, the customer may be able to know that a response is being prepared and will be received soon. Other examples of providing a still image indicator may also be possible.

In embodiments, a video indicator may be provided to the source user at block 682. Generally, providing can include transmitting, conveying, presenting, displaying, sending, indicating, marking, or generating. The video indicator may include a moving image such as a movie, gif, or the like which specifies or denotes the response status of the recipient user. The video image indicator may include a video clip (e.g., automatically playing a video clip), a gif (e.g., moving image of a pencil writing on a piece of paper, gif of a wheel turning), a live camera video image (e.g., a dashboard camera, a webcam), a moving scale (e.g., a bar that fills as the response is completed), a color-changing icon (e.g., a button/box that changes color based on response status), or the like. The video indicator may be provided repeatedly/continually. The video indicator may flash or enlarge on the computing device screen of the source user. The video indicator may appear in the social networking conversation (e.g., video image within the chat conversation) or next to the recipient user (e.g., moving image of pencil writing on paper next to the name of the recipient user).

Consider the following example. A food delivery service may utilize a response status management engine as described herein to deliver a pizza to a customer. Various video indicators may be provided to the customer in order to signify the stage of preparation and delivery of the pizza. As an example, the customer may be provided continually with a progress bar. The bar may be filled 25% when the service request is received, 50% when the pizza is being prepared, 75% when the pizza is being driven to the location for delivery, and 100% when the driver arrives at the location. In this way, the customer may have a moving visual representation of the status of delivery. As another example, the pizza restaurant may be equipped with webcams in the kitchen so the customer can watch their pizza being prepared. The delivery driver may be equipped with a dashboard cam so the customer can track the location of the delivery by continually watching the location of the driver. The video indicator may provide the customer with a better indication of when their pizza will be delivered. Other examples of providing a video indicator may also be possible.

In embodiments, an audio indicator may be provided to the source user at block 683. Generally, providing can include transmitting, conveying, presenting, displaying, sending, indicating, marking, or generating. The audio indicator may include a noise or sound which specifies or denotes the response status of the recipient user. The audio indicator may include an audio clip (e.g., "recipient is typing a response), a sound (e.g., beeping), a ringtone (e.g., a song/tune), or the like. The audio indicator may be provided repeatedly/continually. The audio indicator may change in volume (e.g., grow louder) when the response is closer to being sent/received. The audio indicator of a response status may differ based on the stage of response (e.g., one sound for when a response is 75% complete/a second sound for when a response is sent/a third sound for when a response is received).

Consider the following example. A student may send an email to their professor with a question regarding an assignment. The student may be provided with various audio indicators to specify if the professor is responding and the specific stage of response. As an example, a quiet beeping sound (e.g., a volume level of 10%) may be provided when the professor has received the email but has not opened it yet. The volume may increase to 25% when the professor opens the message. The volume may increase to 70% when the professor is typing a response to the student. The volume may increase to 100% when the message has been sent. The level of volume of the beeping may indicate to the student when to expect a response from the professor. Other examples of providing an audio indicator to the source user may also be possible.

In embodiments, a tactile indicator may be provided to the source user at block 684. Generally, providing can include transmitting, conveying, presenting, displaying, sending, indicating, marking, or generating. The tactile indicator may include a tangible or physical movement which specifies or denotes the response status of the recipient user. The tactile indicator may include a type of vibration (e.g., rapid, slow) number of vibrations (e.g., two, ten), a duration of a vibration (e.g., thirty seconds), a texture on a touchscreen/display screen (e.g., bumpy to indicate a specific response status), or the like. The tactile indicator may change in number, duration, intensity, or texture based on the stage of a response (e.g., slow vibration when a message is being responded to/quick vibration when a response has been provided).

Consider the following example. A patient may be waiting to see a medical professional. The examination room may be equipped with a tablet to indicate the response status of the medical professional (e.g., how long a patient can expect to wait before meeting with the professional). The tablet may be configured to change texture based on the expected waiting time. The tablet screen may be bumpy when the patient first arrives in the examination room, and slowly become smooth until the medical professional arrives. The patient can touch the screen to determine the response status. If the screen is very bumpy, it may be some time (e.g., 30 minutes) before the appointment begins. If the screen is moderately bumpy, there may be a shorter wait time (e.g., 10 minutes) before the appointment begins. If the screen is smooth, the patient can determine that the medical professional is on their way to the examination room. As another example, the tablet may be configured to vibrate based on the expected waiting time. When the medical professional is notified of the arrival of the patient, the tablet may vibrate once. When the patient is at the top of the waiting list to see the medical professional, the tablet may vibrate three times. When the medical professional is on their way to the examination room, the tablet may vibrate five times. Other examples of providing a tactile indicator to the source user may also be possible.

Method 600 concludes at block 699. Aspects of method 600 may provide performance or efficiency benefits related to response status management in a social networking environment. Aspects may save resources such as bandwidth, processing, or memory. As an example, battery life may be saved by providing types or kinds of indicators to the source user. An audio or tactile indicator may alert a source user of a response status without requiring the source user to be using or looking at the computing device. This may prevent a user from wasting battery life by frequently checking a device for a response. Other examples of saving battery life may also be possible.

Figure 7:
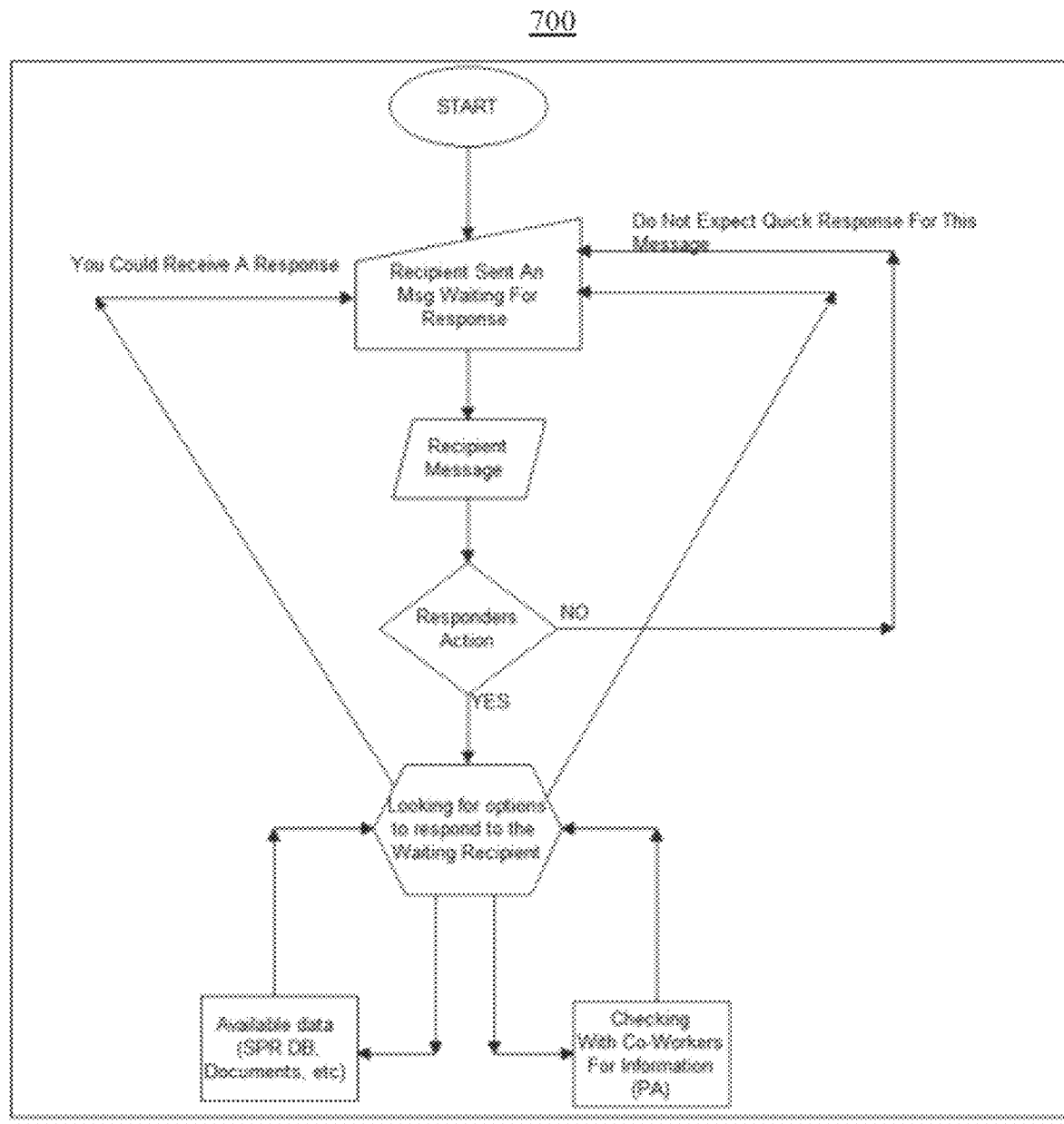
FIG. 7 illustrates an example system for response status management in a social networking environment, according to embodiments.

FIG. 7 illustrates an example system 700 for response status management in a social networking environment, according to embodiments. A message may be detected from the source user to the recipient user in the social networking environment. The message may include a calendar-oriented request and/or an information-oriented request and/or an approval-oriented request. In certain embodiments, a message may include one or more request. As an example, a message may include a patient scheduling an appointment, asking an opinion of a doctor, and asking for a signature to refill a prescription. A set of message response actions may be identified related to the recipient user, including a set of accessed information and/or a set of recipient user activities or inactivity of a recipient user. As an example, a doctor may begin acting to respond to the message from the patient. The doctor may research the patient history in a database and contact a pharmacy. The set of message response actions may be monitored using a set of sensor devices related to the recipient user. The keyboard of the computer used by the doctor may be equipped with a sensor on the keyboard/mouse to indicate that the doctor is responding/working on responding to the message from the patient. A response status may be determined, including a nature of a set of response operations and/or an anticipated response and/or an expected response timeline. As an example, the response status of the doctor may include the information that the doctor is on the phone with the pharmacy and is viewing the patient medical history, an anticipated response of approval to refill the prescription and a likely date for an appointment, and an expectation that the message will be sent two minutes after the doctor finishes the phone call, which is expected to last five minutes based on historical data. An indication of the response status may be provided to the source user, which may include a still image indicator and/or a video indicator and/or an audio indicator and/or a tactile indicator. As an example, the patient may be provided with an icon of a cell phone when the doctor is on the phone, a gif of a wheel turning when the doctor is typing, a beeping sound when the doctor hangs up the phone, and a vibration when the message has been sent. Other examples of response status management in a social networking environment may also be possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for response status management in a social networking environment, the method comprising:
    detecting in response to a triggering event, in the social networking environment, a message from a source user to a recipient user,
        wherein the triggering event is the recipient user being added to a guest list, and wherein the message is a party invitation;
    identifying, related to the recipient user, a set of message response actions;
    determining, based on the set of message response actions, a response status,
        wherein the response status relates to the recipient user; and
    providing, to the source user, an indication of the response status,
        wherein the indication is a live video indicator.
2. The method of claim 1, further comprising:
    detecting, in the social networking environment, a calendar-oriented request from the source user to the recipient user, wherein the calendar-oriented request includes information related to the party invitation, including a date and time, one or more other invitees, if any, and an RSVP date.
3. The method of claim 1, further comprising:
    detecting, in the social networking environment, an information-oriented request from the source user to the recipient user.
4. The method of claim 1, further comprising:
    detecting, in the social networking environment, an approval-oriented request from the source user to the recipient user.
5. The method of claim 1, further comprising:
    identifying, related to the recipient user, a set of accessed information in response to detecting the message.
6. The method of claim 1, further comprising:
    identifying, related to the recipient user, a set of recipient user activities in response to detecting the message.
7. The method of claim 1, further comprising:
    identifying, related to the recipient user, inactivity in response to detecting the message.
8. The method of claim 1, further comprising:
    monitoring, related to the recipient user, the set of message response actions using a set of sensor devices.
9. The method of claim 1, further comprising:
    determining, based on the set of message response actions, a nature of a set of response operations.
10. The method of claim 1, further comprising:
    determining, based on the set of message response actions, an anticipated response.
11. The method of claim 1, further comprising:
    determining, based on the set of message response actions, an expected response timeline.
12. The method of claim 1, further comprising:
    providing, to the source user, a still image indicator which indicates the response status.
13. The method of claim 1, further comprising:
    providing, to the source user, a video indicator which indicates the response status.
14. The method of claim 1, further comprising:
    providing, to the source user, an audio indicator which indicates the response status.
15. The method of claim 1, further comprising:
    providing, to the source user, a tactile indicator which indicates the response status.
16. The method of claim 1, further comprising:
    executing, in a dynamic fashion to streamline response status management in the social networking environment, each of:
        the detecting, the identifying, the determining, and the providing.
17. The method of claim 1, further comprising:
    executing, in an automated fashion without user intervention, each of:
        the detecting, the identifying, the determining, and the providing.
18. The method of claim 1, wherein the party invitation is sent as an email which includes a calendar-oriented request and which indicates a purpose for the party invitation, a list of all invitees, and an RSVP date.
19. A system for response status management in a social networking environment, the system comprising:
    a memory having a set of computer readable computer instructions, and
    a processor for executing the set of computer readable instructions, the set of computer readable instructions including:
    detecting in response to a triggering event, in the social networking environment, a message from a source user to a recipient user,
        wherein the triggering event is the recipient user being added to a guest list, and wherein the message is a party invitation;
    identifying, related to the recipient user, a set of message response actions;
    determining, based on the set of message response actions, a response status,
        wherein the response status relates to the recipient user; and
    providing, to the source user, an indication of the response status,
        wherein the indication is a live video indicator.
20. A computer program product for response status management in a social networking environment, the computer program product comprising a computer readable storage medium having program instructions embodied therewith, wherein the computer readable storage medium is not a transitory signal per se, the program instructions executable by a processor to cause the processor to perform a method comprising:
- detecting in response to a triggering event, in the social networking environment, a message from a source user to a recipient user,
  - wherein the triggering event is the recipient user being added to a guest list, and wherein the message is a party invitation;
- identifying, related to the recipient user, a set of message response actions;
- determining, based on the set of message response actions, a response status,
  - wherein the response status relates to the recipient user; and
- providing, to the source user, an indication of the response status,
  - wherein the indication is a live video indicator.

* * * * *